W. L. BLISS.
STARTING AND LIGHTING SYSTEM FOR AUTOMOBILES.
APPLICATION FILED MAY 13, 1914.
1,293,314. Patented Feb. 4, 1919.
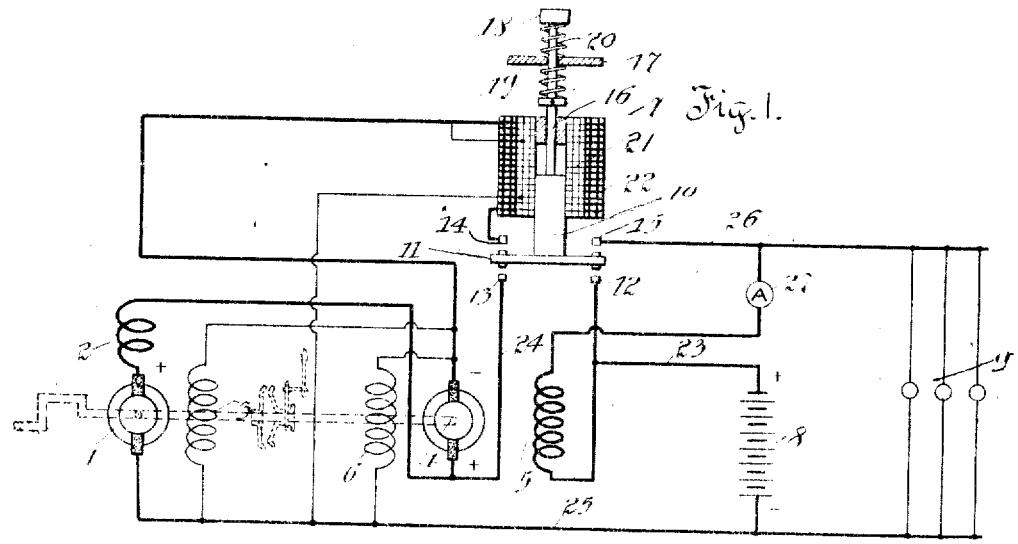
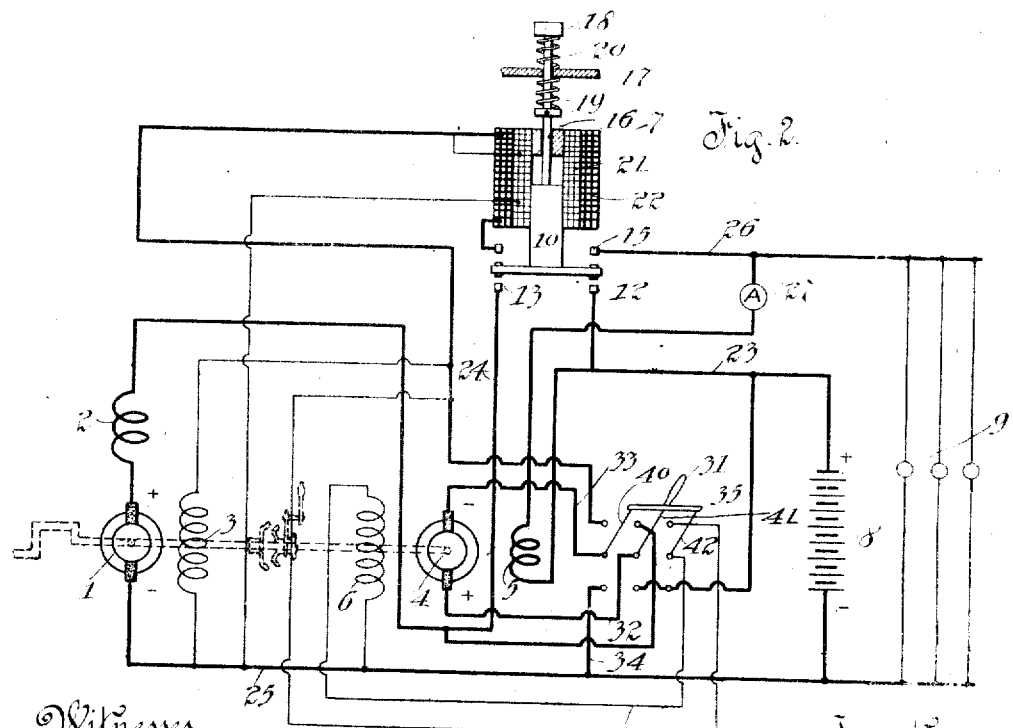
Witnesses
Robert F. Weir
R. H. Van Nest
Inventor
William L. Bliss,
by Edwin B. H. Tower
Atty.

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

STARTING AND LIGHTING SYSTEM FOR AUTOMOBILES.

1,293,314.

Specification of Letters Patent.

Patented Feb. 4, 1919.

Application filed May 13, 1914. Serial No. 838,247.

*To all whom it may concern:*

Be it known that I, WILLIAM L. BLISS, a citizen of the United States, residing at Niagara Falls, in the county of Niagara and State of New York, have invented new and useful Improvements in Starting and Lighting Systems for Automobiles, of which the following is a full, clear, concise, and exact description, reference being had to the accompanying drawing, forming a part of this specification.

This invention relates to starting and lighting systems for automobiles.

The invention relates to the type of automobile starting and lighting system in which a dynamo-electric machine serves as a starting motor to start the engine and thereafter as a generator operated by the engine to charge a storage battery and to operate lamps or other translating devices. In such a system it is desirable that a maximum starting torque should be provided for starting the engine and that the dynamo-electric machine, when acting as a generator, should be automatically regulated to provide the proper charging current for the battery throughout wide ranges of engine speeds.

An object of the present invention is to provide regulating means for a variable speed generator employed to charge a storage battery, whereby the generator may become effective at a relatively low speed for charging the battery.

Another object of the invention is to provide improved regulating means for a variable speed generator employed to charge a storage battery, whereby the range of speeds within which charging of the battery may be effected, is increased.

Another object of the invention is to provide regulating means for a variable speed generator which will regenerate the energy consumed in regulation and turn it back into useful and available power.

Another object of the invention is to provide regulating means for a variable speed generator, whereby the output of the generator at low speeds may be increased and the output at high speeds may be decreased, thereby maintaining the output within predetermined limits throughout wide variations in generator speed.

Another object of the invention is to provide a dynamo-electric machine which is adapted to operate as a regulating machine for a variable speed generator and which may also be operated independently as a motor.

Another object of the invention is to provide a simplified controlling switch for automobile starting and lighting systems.

Two embodiments of the invention, whereby these and other objects may be attained, are illustrated in the accompanying drawings, in which—

Figure 1 illustrates diagrammatically, the improved starting and lighting system.

Fig. 2 illustrates diagrammatically, a modification thereof.

In the embodiments of the invention here-in described, a main dynamo-electric machine and an auxiliary dynamo-electric machine are employed. These machines are both mechanically connected to the automobile engine to be driven thereby. A single switch serves to make the various connections of the system, whereby the main machine may operate as a motor to start the engine and thereafter as a generator, regulated by the auxiliary machine, to charge the storage battery. When the switch is in starting position, the main machine acts as a motor with high torque to start the engine. Thereafter the two machines act as generators driven by the engine, their voltages being added so that sufficient voltage to charge the battery may be attained at relatively low engine speeds. At battery charging voltage, the switch automatically connects the generators to the battery and thereafter as the speed increases, the auxiliary machine gradually reduces its voltage and finally, at high speeds, automatically reverses and opposes the main generator, so as to maintain the combined output within predetermined safe limits.

The machines are each provided with shunt and series windings which, under normal generating conditions, act differentially. The windings of the two machines are so proportioned that when the charging current flows through the armatures and differential fields in series, the relative effect of the differential winding of the auxiliary machine upon its shunt field is greater than the relative effect of the differential winding of the main machine upon its shunt winding, *i. e.*, the percentage of differential compounding in the two machines is different so that the current which will cause the series field winding of the auxiliary machine to overpower its shunt field winding completely, will not be great enough to cause the series field winding of the main generator to overpower the main shunt winding, but will merely reduce the effect of the same. By this arrangement of having the same current flow through two differentially wound generators of different characteristics, an effect is produced whereby the strength of current in the series circuit automatically and selectively governs the voltage of the auxiliary machine, both in value and direction, to re-act upon the main machine to give a tendency toward stability.

Fig. 1 illustrates the main machine having an armature 1, series field 2, and a shunt field 3; the auxiliary machine having an armature 4, a series field 5 and a shunt field 6, the combined automatic switch and starter switch 7 and a battery 8, and lamps or other translating devices 9, connected across the main leads of the system.

The armatures 1 and 4 of the two machines are connected to the engine; the armature of the main machine being directly mounted on the engine shaft to serve as the fly wheel of the engine, or being geared to the fly-wheel as desired, and the auxiliary machine having its armature connected by means of a clutch to the pump shaft or any other moving part of the engine.

The combined automatic switch and starter switch 7 comprises a plunger 10, carrying a bridging member 11, adapted to coöperate in one extreme position with contacts 12 and 13, and in the other extreme position with contacts 14 and 15. The plunger is provided with a stem 16, which may project through the dash or foot-board 17 of the automobile, and is provided with an operating handle or button 18. Coil springs 19 and 20 on opposite sides of the dash or foot-board, tend to maintain the plunger in neutral position, with the bridging member out of engagement with either of the sets of contacts. The switch may be moved in one direction by means of the handle to bridge one pair of contacts and is adapted to be automatically moved in the other direction to bridge the other pair of contacts. To provide for automatic operation, the switch has a shunt lifting coil 21 connected across the main leads of the system and a series holding coil 22 adapted to be connected in the main generator circuit when the circuit between the generator and storage battery is closed.

When the switch is moved to starting position in which the contacts 12 and 13 are connected together, a circuit is established whereby the battery may operate the main dynamo-electric machine as a motor to start the engine. The motor circuit is completed from the positive terminal of the battery, through conductor 23, contact 12, bridging member 11, contact 13, conductor 24, series field 2 and conductor 25 to the negative terminal of the battery, thus operating the main dynamo electric machine as a series motor to start the engine. As soon as the engine begins to operate under its own power, the foot switch is released and assumes neutral position in which the bridging member 11 is out of contact with both sets of contacts 12—13 and 14—15. The armature 1 of the starter, driven by the engine, begins to generate and supplies current to the shunt field 6 of the auxiliary machine which also begins to generate. The sum of the electromotive forces of both machines is impressed upon the shunt fields 3 and 6 to excite the same, these fields being thereby subject to approximately double voltage. This allows the machine 1 to build up rapidly so that it may be cut in at a comparatively low speed. As soon as the voltage has risen to the proper value for charging the battery, the automatic switch operated by the coil 21 closes the contacts 14—15. Differential field 5 of the auxiliary machine is thereby connected in series with battery 8 in the charging circuit. The main generator, in addition to supplying the lamps 9, now furnishes current to the storage battery through the series coil 2 which acts differentially with respect to the shunt coil 3 through the armature 4 of the auxiliary machine, through series coil 22 of the automatic switch, contacts 14—11—15, conductor 26, ammeter 27, differential coil 5 of the auxiliary machine, conductor 23, through the storage battery 8 and back to armature 1.

Current flowing through the differential coil 5 which is in series with the battery counteracts, to some extent, the effect of the shunt winding 6 and as the current rises in the differential coil 5, the voltage of the armature 4 approaches zero. On further increase of current, the differential winding 5 overpowers the shunt winding 6 and reverses the polarity of the armature 4. The voltage of the armature 4, which is now in a reverse direction opposes the voltage of the main generator armature 1, and also weakens the shunt field 3, thus exercising control over the main generator to keep the output of the same within predetermined limits. The auxiliary machine 4 at this time is operated as a motor and regenerates the power which it consumes by aiding in turning the engine through the pump shaft to which it is clutched.

It can be seen that there are a number of influences tending toward regulation of the charging generator 1. The differential field 5 of the auxiliary machine gradually reduces the voltage of its armature 4 and when the differential field 5 overpowers the shunt field 6, the voltage of the armature 4 will be in the reverse direction and will tend to oppose the voltage of the main armature 1. The decrease in voltage of armature 4 and the subsequent reversal has diminished the flow of current through the shunt field 3 of the main generator. The differential field 2 also opposes the shunt field 3. These various factors limit the output of the charging generator to desired values.

In the modification, shown in Fig. 2, the auxiliary machine may be operated as an independent shunt motor for driving a compressor, or tire pump, or the like. For this purpose a three-pole switch 31 having blades 40, 41 and 42 is connected to the armature leads and the shunt field lead respectively. When the machine is to be operated as a shunt motor for compressing air or for other purposes, the switch 31 is placed in the lower position whereby armature terminals 32 and 33 attached to the switch blades 41—40 are connected to the battery 8 by wires 34 and 35 respectively. At the same time the shunt field winding 6 is connected to the battery lead 35 by switch blade 42 and wire 37. The machine then operates as a shunt wound motor.

It is understood, of course, that when this auxiliary machine is operated as a shunt motor, it is first unclutched from the pump motor, it is first unclutched from the pump shaft and is clutched to the tire pump shaft in a well known manner to operate the tire pump (not shown). When the switch 31 is thrown to the upper position, the machine is connected back into the starting and charging circuit, just as shown and described in connection with Fig. 1.

It can be seen from the description of the above arrangement that a very efficient system has been provided. The main generator is operated as a series motor for starting purposes and as a differentially wound generator for charging. The auxiliary machine can be utilized as an independent shunt motor. During charging it serves as a very efficient regulator of the main machine. By the use of double voltage for exciting the field coil 3, the main generator is cut in and charging can begin at comparatively low speeds, much lower than would otherwise be possible. Regulation is effected in a very efficient manner because the tendency of the auxiliary machine to supply an opposing voltage reduces the current in the winding 3 of the main machine without the use of rheostats or resistances, which are necessarily wasteful. The energy consumed by the auxiliary machine in regulation is very largely regenerated and turned back to the engine through the pump shaft by means of the motoring effect of this machine.

From the above it is seen that a system especially adapted to motor car service has been provided, but the invention is not limited to any particular use nor to any of the details of construction above described and the invention is not to be limited in any sense except as limitations may be imposed in the appended claims.

What I claim as new and desire to secure by Letters Patent of the United States is:

1. An electrical system of generation and regulation including a load circuit, a main dynamo-electric machine, an auxiliary dynamo-electric machine, means for connecting the armatures of said machines in series with said load circuit, said machines having each a shunt winding and a series differential winding, each of said shunt windings being connected to be subjected to the sum of the voltages of the two armatures.

2. A battery charging system including a prime mover, a battery to be charged, a main differentially wound generator and an auxiliary differentially wound generator, said generators being driven by said prime mover and having their armatures connected in series with the storage battery, the shunt winding of each of said generators being connected to be subjected to the sum of the voltages of the two armatures.

3. In a starting and charging system, a storage battery, a main dynamo electric machine, an auxiliary dynamo electric machine, means for connecting the armatures of said machines in series with said storage battery, said machines having each a shunt winding and a series differential winding, each of said shunt windings being connected to be subject to the sum of the voltages of the two armatures.

4. In a starting and charging system, the combination of an internal combustion engine, a storage battery, a main differentially wound dynamo electric machine, and an auxiliary differentially wound dynamo electric machine, said machines having unequal percentages of differential compounding, said machines being driven by said engine and having their armatures connected in series with the storage battery.

5. In a starting and charging system, the combination of an internal combustion engine, a storage battery, a main dynamo electric machine and an auxiliary dynamo electric machine, the battery being connected to said main machine to operate the same as a series motor for starting, and means to connect the two machines in series with the storage battery to charge the same, said last means being controlled by the sum of the voltages of the two machines.

6. In a starting and charging system, the combination of an internal combustion engine, a storage battery, a main dynamo electric machine having a shunt and a differential series winding, an auxiliary dynamo electric machine having a shunt and a differential series winding, both of said machines being connected to said engine, said battery being connected to said first machine through the series winding thereof to operate said first machine as a starting motor, and means to connect said two generators in series with said battery to charge the same, said shunt windings being subject to the sum of the voltages of both said machines.

7. In a starting and charging system, a main generator having a shunt field winding and a differential series field winding, an auxiliary machine having a shunt field winding and a series differential field winding, a common variable speed means for driving both said generators, a storage battery, an automatic switch for connecting said battery in series with both said generators, and manual means to connect the battery to said first generator to operate the same as a series motor.

8. In an electrical system for automobiles, a main dynamo electric machine, an auxiliary dynamo-electric machine in series therewith to assist and regulate said main dynamo-electric machine, and means whereby said auxiliary machine may be independently operated as a shunt motor.

9. An electrical system of generation and regulation including a load circuit, a main dynamo-electric machine having shunt and series differential field coils, an auxiliary dynamo-electric machine having shunt and series differential field coils, means for connecting said machines in series whereby their shunt fields may be subjected to the sum of the voltages of the machines, said load circuit being supplied by said machines in series, the differential series winding of said auxiliary machine being connected in series with the load circuit whereby, as current in said circuit tends to increase, the voltage of said auxiliary machine will be decreased by the increased energization of its differential field winding, and said machines having different characteristics whereby a predetermined increase in current will cause said auxiliary machine to reverse in polarity to reduce the output of said main machine.

10. In a starting and charging system, a main generator, an auxiliary generator, a shunt field for the main generator and a shunt field for the auxiliary generator, each of said shunt fields being energized by the sum of the voltages of both said machines, a storage battery and an automatic cut in switch to connect said battery to both said generators controlled by the sum of said voltages.

11. In a starting and charging system, a main dynamo electric machine, a shunt field therefor, an auxiliary dynamo electric machine and a shunt field therefor, each of said shunt fields being energized by the sum of the voltages of both machines, a storage battery, an automatic cut in switch controlled by the sum of the voltages to connect the two machines in series with the battery, and a field winding for said second machine in series with the battery causing said auxiliary machine to regulate the output of the first machine.

12. An automobile starting and lighting system including a main dynamo electric machine having shunt and series differential field coils, an auxiliary dynamo electric machine having shunt and series differential field coils, means for connecting said machines in series whereby their shunt fields may be subjected to the sum of the voltages of the machines, a storage battery to be charged by said machines in series, the differential series winding of said auxiliary machine being connected in series with the battery charging circuit, whereby as the charging current tends to increase the voltage of said auxiliary machine will be decreased by the increased energization of its differential field winding, and said machines having different characteristics whereby a predetermined increase in current will cause said auxiliary machine to reverse in polarity to reduce the output of said main machine.

13. An electrical system of generation and regulation including a load circuit, a main dynamo-electric machine, an auxiliary dynamo-electric machine, means for connecting the armatures of said machines in series with said load circuit, said machines having each a shunt field winding and a series differential field winding, one of said machines having a different percentage of compounding from the other.

14. In an electrical system for automobiles, a main dynamo-electric machine, an auxiliary dynamo-electric machine in series therewith to assist and regulate said main dynamo-electric machine, a storage battery, and switching means whereby said main machine may be independently operated as a series motor or said auxiliary machine independently operated as a shunt motor.

15. In a starting and charging system, the combination of an internal combustion engine, a storage battery, a main differentially wound dynamo-electric machine, and an auxiliary differentially wound dynamo-electric machine, said latter machine being adapted to reverse in polarity with increase of current therethrough, said machines being driven by said engine and having their armatures connected in series with the storage battery.

16. An electrical system of generation and regulation including a load circuit, a main dynamo-electric machine, an auxiliary dynamo-electric machine, means for connecting the armatures of said machines in series with said load circuit, said machines having each a shunt field winding and a series differential field winding, said auxiliary machine being adapted to reverse in polarity with increase of current therethrough.

In witness whereof, I have hereunto subscribed my name in the presence of two witnesses.

WILLIAM L. BLISS.

Witnesses:
WM. A. TURBAYNE,
FRED. J. MCCARTHY.